No. 779,421.  
Patented January 10, 1905.

UNITED STATES PATENT OFFICE.

FLETCHER B. HOLMES, OF WOODBURY, NEW JERSEY, ASSIGNOR TO THE EASTERN DYNAMITE COMPANY, OF WILMINGTON, DELAWARE, A CORPORATION OF NEW JERSEY.

PROCESS OF MAKING NITRATED STARCH.

SPECIFICATION forming part of Letters Patent No. 779,421, dated January 10, 1905.

Application filed July 21, 1904. Serial No. 217,501.

*To all whom it may concern:*

Be it known that I, FLETCHER B. HOLMES, a citizen of the United States, residing at Woodbury, county of Gloucester, and State of New Jersey, have invented a new and useful Improvement in Processes of Making Nitrated Starch, of which the following is a full, clear, and exact description, reference being had to the accompanying drawings, which form a part of this specification.

My invention relates to a method of producing a stable nitrated starch.

Heretofore there have been many efforts made to produce a stable nitrated starch; but no such compound has been produced up to the present time.

I have discovered a process or method whereby I produce a stable nitrated starch.

In carrying out my invention I treat starch with an admixture of concentrated nitric and sulfuric acids, preferably in the proportion of twenty-five parts of starch to one hundred parts of the mixed acids, in which nitric acid is present as 32.5 per cent. and the sulfuric acid as 64.5 per cent. and water as three per cent., although I do not intend to limit myself to these precise proportions.

The proportions which I have above set out are also a discovery of mine and which form the subject-matter of a separate application filed by me at the same date as this application.

After the starch has been nitrated by admixture with the reagents above set forth the spent acids are removed, preferably by drowning in water, and the nitrated starch is separated out. Instead of drowning the acids the acids may be separated by filtration or by centrifugal separation or in any manner desired. The nitrated starch produced up to this point is a very unstable compound. I stabilize this nitrated starch in the following manner: I boil the same in water, with the addition of a small amount of some acid-neutralizing reagent which is practically insoluble in water—as, for example, the carbonate of an alkaline earth, such as calcium carbonate. I have found that by long-continued boiling in water containing a small amount of the carbonate of an alkaline earth, such as calcium carbonate, a product is obtained which has a high degree of stability. The carbonates of the alkaline earths produce a result impossible with the soluble carbonates, such as sodium carbonate, for the following reason: A solution of sodium carbonate or any soluble carbonate decomposes nitrostarch quite rapidly when hot, while the more insoluble carbonates, such as the carbonates of the alkaline earths, have a less strongly alkaline reaction and are thus able to keep the boiling water neutral without decomposing the nitrostarch. I therefore use, as stated above, the carbonate of one of the alkaline earths, preferably calcium carbonate. In practice I have found that the stabilizing result is marked after boiling about twenty-five hours and that after seventy-five to one hundred hours boiling there is produced a compound which is exceedingly stable, as stable, in fact, as the best purified guncotton. After the action above described has taken place the water is removed from the product and the product dried.

Having now fully described my invention, what I claim, and desire to protect by Letters Patent, is—

1. The hereinbefore-described process of producing a stable nitrated starch, which consists in nitrating the starch, separating the nitrated starch from the acids, and boiling the nitrated starch in water in the presence of an insoluble acid-neutralizing reagent.

2. The hereinbefore-described process of producing a stable nitrated starch, which consists in nitrating the starch, separating the nitrated starch from the acids, and boiling the nitrated starch in water in the presence of the carbonate of an alkaline earth.

3. The hereinbefore-described process of producing a stable nitrated starch, which consists in nitrating the starch separating the nitrated starch from the acids, and boiling the nitrated starch in water in the presence of calcium carbonate.

In testimony of which invention I have hereunto set my hand at Philadelphia on this 20th day of July, 1904.

FLETCHER B. HOLMES.

Witnesses:
M. M. HAMILTON,
WILLIAM B. MARKS.